July 12, 1960     E. W. HAYES     2,944,725
PIE SHIELD

Filed July 16, 1958     3 Sheets-Sheet 1

INVENTOR.
EDMUND W. HAYES
BY
Lindsey and Prutzman
ATTORNEYS

July 12, 1960 E. W. HAYES 2,944,725
PIE SHIELD

Filed July 16, 1958 3 Sheets-Sheet 2

INVENTOR.
EDMUND W. HAYES
BY
Lindsey and Prutzman
ATTORNEYS

July 12, 1960  E. W. HAYES  2,944,725
PIE SHIELD

Filed July 16, 1958  3 Sheets-Sheet 3

INVENTOR.
EDMUND W. HAYES
BY
Lindsey and Prutzman
ATTORNEYS

United States Patent Office 2,944,725
Patented July 12, 1960

2,944,725
PIE SHIELD
Edmund W. Hayes, 77 Douglas Road, Glastonbury, Conn.
Filed July 16, 1958, Ser. No. 748,835
6 Claims. (Cl. 229—43)

This invention relates to protective devices for foodstuffs and more particularly to protective shields for bakery products such as pies.

Breakage and disfigurement of baked goods, and particularly breakage of pie crusts, is a major problem in the storage and shipment of such foodstuffs. Most of the present day methods of storage and shipment, which often include insertion of the pie and pie pan within a box, have failed to prevent movement of the pie relative to the pan as well as movement of the pie and pie pan relative to the box, and thus have failed to prevent breakage of the pie. In fact, many manufacturers of pies have, on occasion, experienced breakage as high as 100 percent when shipping pies in the conventional manner.

It is therefore an object of this invention to provide a shield for pies and the like which will substantially eliminate the breakage that renders the pies unattractive in appearance and unsalable.

It is another object of this invention to provide a shield which can be easily attached to and removed from the pie and pie pan and which is economical to manufacture so as to be disposable after use.

It is a further object of this invention to provide a protective shield for use with pies, either fresh or frozen, that will limit movement of the pie relative to its pan while, at the same time, limiting movement of pie and pan relative to a box enclosure.

A further object is to provide a pie shield which can be attached to a pie pan in a simple and easy manner, which will remain securely in place under normal conditions of use, and which will enhance the appearance of the product to the consumer.

Details of these objects and of the invention as well as other objects thereof are set forth in the following specification and are illustrated in the attached drawings which form a part thereof.

Figure 1:
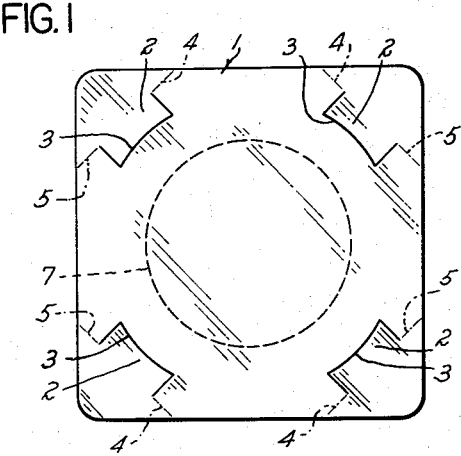
Fig. 1 is a top view of a preferred embodiment of the protective shield prior to assembly on a pie pan.

Referring now to the embodiment of the invention shown as a blank in Fig. 1, it is seen that pie shield 1 is a generally rectangular sheet of cardboard, or the like, having flaps or tabs 2 cut therein near each corner. The shape of shield 1 is preferably that of the outer container or box with which it is used and the position and number of flaps 2 are determined by the geometry of the pie pan so that relative movement is limited. Each flap 2 is cut so that the inner edge 3 is directed toward the center of the sheet along a diagonal thereof and, in the preferred embodiment, each inner edge 3 is arcuately shaped to correspond to the configuration of the pie pan with which it is to be used. Score lines 4 and 5, extending from the hinge end of each flap 2 to the edge of shield 1 in a direction substantially perpendicular to the diagonal of shield 1, form a line of weakness to facilitate bending movement of flap 2 and the shield corner as a unit along these lines.

Figure 2:
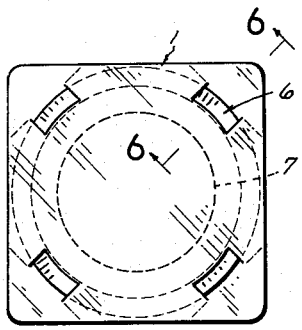
Fig. 2 is a top view of the shield attached to a pie pan.
Figure 3:
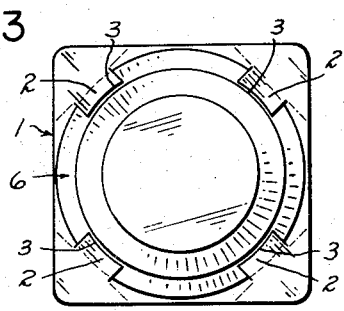
Fig. 3 is a bottom view of the shield attached to a pie pan.
Figure 4:
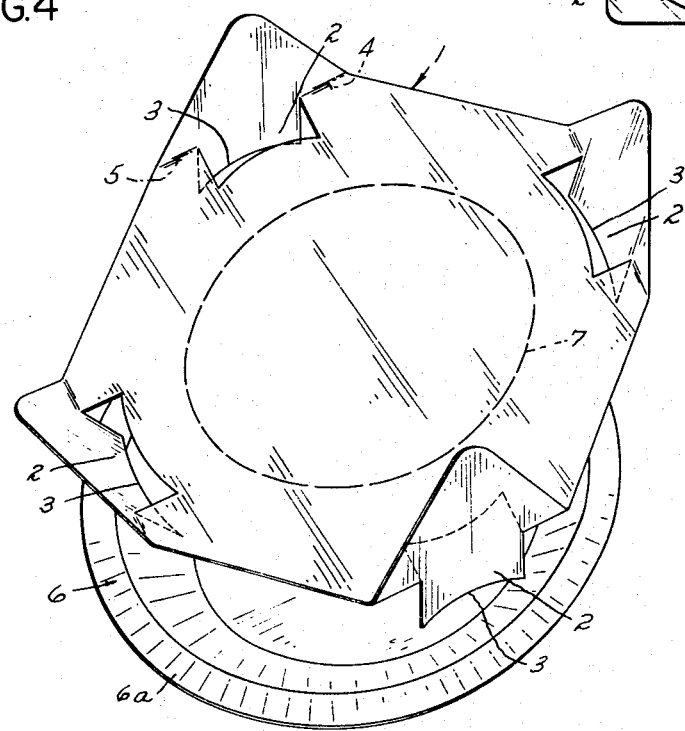
Fig. 4 is a perspective view of a shield just prior to assembly on a pie pan.

Referring now to Figs. 2, 3, and 4, it is seen that upward movement of the corners of sheet 1 by bending along score lines 4 and 5 serves to depress the inner ends of flaps 3 so that they will clear the outside edge of pie pan 6. In commercial practice, pies are shipped and sold in the containers in which they are baked which may be made of inexpensive relatively rigid materials such as metal foil, fibrous board sheet material, etc. These are referred to generically herein as "pie pans." Shield 1 is then lowered into contact with pie pan 6 and flap end 3 is raised into contact with the underside of rim 6a by depressing the corners of sheet 1. This movement also places the arcuate edge 3 in juxtaposition to the side wall of the pan 6 to further assist in positioning the shield relative to the pan. The assembly of shield 1 with pie pan 6, in the manner just described, positions the shield so that the pie shield overlies the crust of the pie and has its corner portions and, if desired, its edge portions, extending beyond the periphery of the pie so to prevent contact with pie and its crust and to limit movement of the pie relative to the pie pan. It is noted, at this point, that the drawings show a dotted circle 7 in shield 1 which portion may be scored or severed for removal if desired to give a visible indication of the nature of the contents in container 6.

Figure 5:
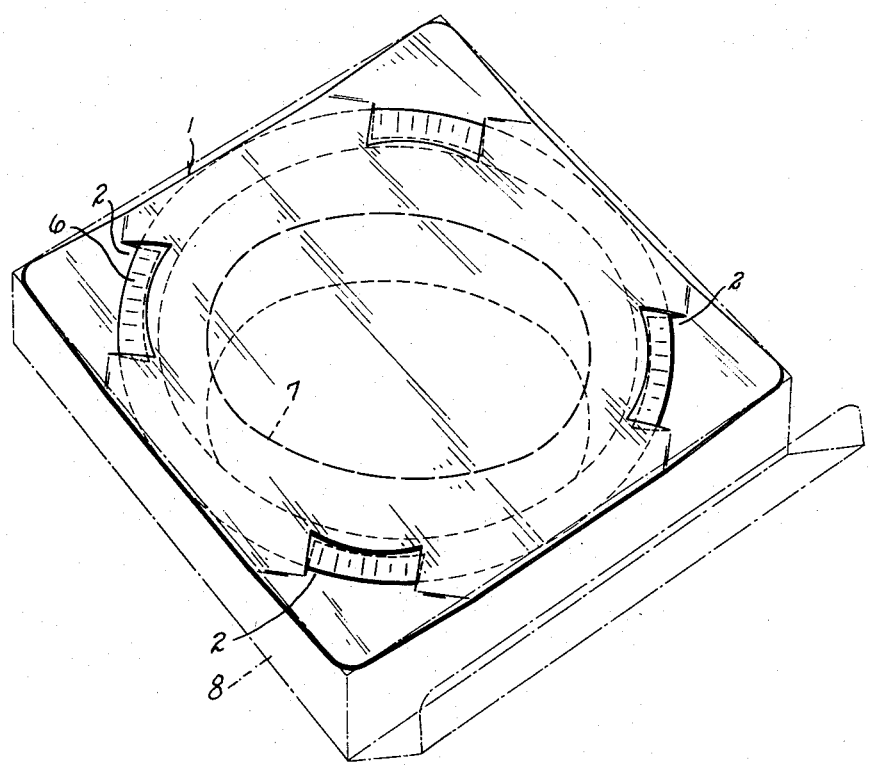
Fig. 5 is a perspective view of the shield and pie pan positioned within an outer protective box.
Figure 6:
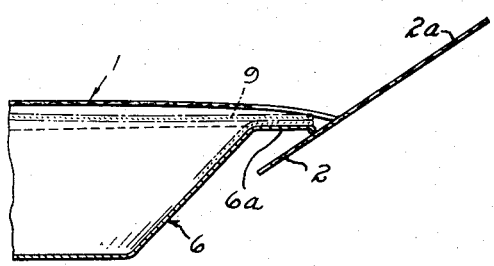
Fig. 6 is a partial cross section taken along the line 6—6 of Fig. 2 showing the relationship of the cover, pan and a pie contained therein.
Figure 7:
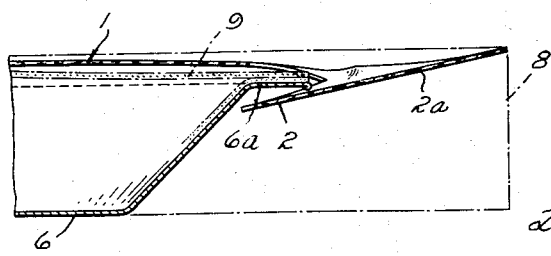
Fig. 7 is a view similar to Fig. 6 with the box shown in dotted lines.

Referring now to Figs. 5, 6 and 7, shield 1 and pie pan 6 are shown assembled for use with box 8 (shown in dotted lines). In the interests of clarity of presentation, the pie has been omitted from Figs. 1–5 but it is shown in relationship to the pie pan and shield in Figs. 6 and 7. Shield 1 is dimensioned to generally conform to the inside dimensions of box 8 thereby substantially preventing lateral movement of the pie pan 6 within box 8. As illustrated in Fig. 6, when the protective corner or shield 1 is first mounted on the pie pan, flap 2 is in engagement with the underside of rim 6a, and corner portion 2a is partially elevated because the thickness of rim 6a and the pie crust 9 tends to prevent corner 2a from assuming a planar position. However, when the assembled shield 1 and pie pan 6 are inserted within box 8 (as clearly seen in Fig. 7), corner portions 2a of the shield are depressed by box 8 thereby effectively locking shield 1 in place in firm engagement with the crust of the pie and holding it securely relative to pan 6. Such engagement serves both to restrain movement of the pie relative to pie pan 6 and to restrain movement of pie pan 6 relative to box 8.

Figure 8:
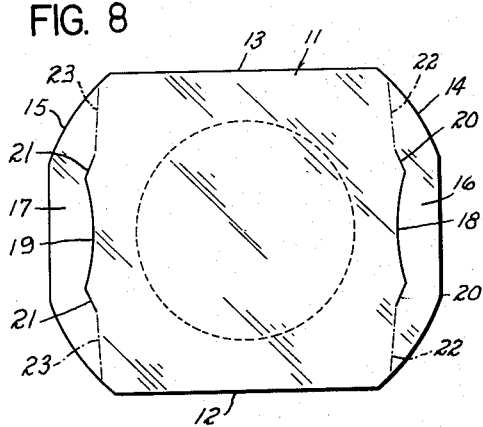
Fig. 8 is a top view of a second embodiment of the protective shield prior to assembly on a pie pan.

Referring now to Fig. 8, another embodiment of this invention is shown in which shield 11 is shown as a sheet of cardboard having generally parallel sides 12 and 13 and rounded sides 14 and 15. Centrally disposed and adjacent rounded sides 14 and 15 are a pair of flaps 16 and 17 which have inwardly directed arcuate portions 18 and 19 and oblique straight cut portions 20 and 21 formed by lines of severance of that shape. Score lines 22 and 23 are formed in the cardboard and extend from the end of the straight flap portions 20 and 21 to the outside edges, along a line obliquely related to straight edges 12 and 13 of shield 11.

Figure 9:
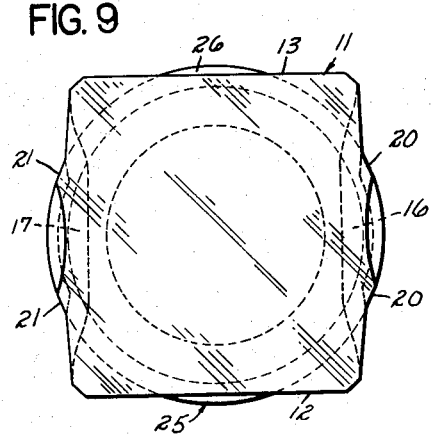
Fig. 9 is a top view of the shield of Fig. 8 attached to a pie pan.
Figure 10:
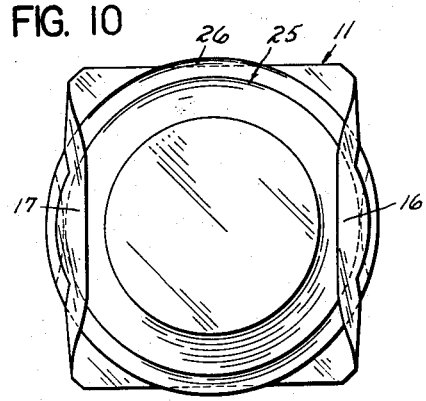
Fig. 10 is a bottom view of the shield of Fig. 8 attached to a pie pan.

Figs. 9 and 10 show pie shield 11 assembled on a conventional circular pie pan 25 having an outwardly extending rim 26. As viewed from the top (see Fig. 9), shield 11 has a generally rectangular shape when assembled to container 25 so that flaps or tabs 16 and 17 are bent down to engage the undersurface of rim 26 of container 25. As most clearly seen in Figs. 9 and 10, straight portions 20 and 21 of flaps 16 and 17 generally conform to the outer periphery of rim 26, and arcuate portions 18 and 19 form the tab ends which engage the underside of rim 26. As is clearly evident, flaps 16 and 17 are movable along score lines 22 and 23.

Figure 11:
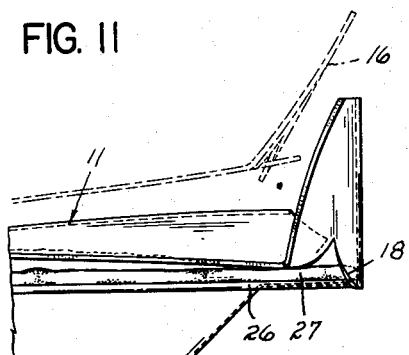
Figs. 11, 12 and 13 are partial side views showing the shield of Fig. 8 in various stages of assembly on the pie pan.
Figure 12:
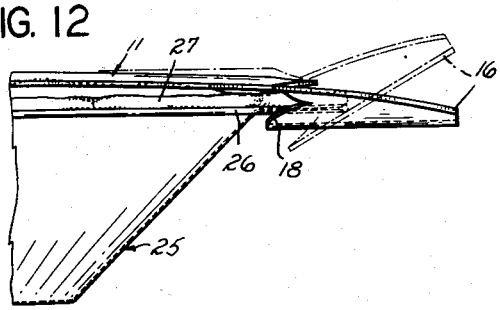
Figure 13:
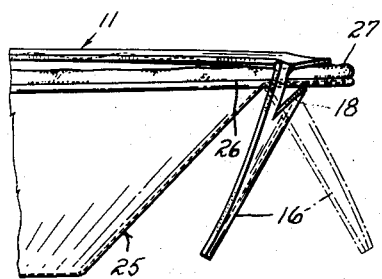

Referring now to Figs. 11 through 13 in which container 26 supports a schematically represented pie having a crust 27 overlying rim 26, it is seen that assembly of shield 11 to pan 25 is commenced by raising flap 16 (the operation of flap 17 is identical and therefore not described) to the elevated position shown in the dotted lines of Fig. 11. Continued inward movement of flap 16 to the position shown in solid lines in Fig. 11 enables arcuate portion 18 of tab 16 to be distorted outwardly to engage the side of rim 26. As shown in Fig. 12, outward and downward movement of flap 16 to the dotted position and then to the solid position brings the arcuate portion 18 of flap 16 into engagement with the underside of rim 26. If the assembly of shield 11 to tin 25 were stopped at the position shown by the solid lines of Fig. 12, the nature of the holding engagement between shield 11 and pan 25 would be similar to that described for Figs. 1 through 7. However, the embodiment shown in Fig. 8 has the additional advantage that continued downward and inward movement of flap 16 to the dotted position and then to the solid position shown in Fig. 13, causes flap 16 to "snap overcenter" so that the underside of flap 16 engages the underside of rim 26 to effectively lock shield 11 onto pan 25. The snapped-over position shown in Figs. 9, 10 and 13 effectively precludes accidental disengagement of flaps 16 and 17 from pan 25.

Removal of shield 11 from pan 25 is accomplished by reversing the assembly feature, i.e., snapping flaps 16 and 17 overcenter and elevating them so as to clear rim 26.

Both described embodiments of this invention can be made from conventional cardboard stock thereby making the cost of manufacture low enough to permit disposal of the shield after a single use.

The pie shield of the present invention has been thoroughly tested commercially in large quantity and has been found effective for substantially eliminating breakage under normal conditions of use. The shield does not materially add to the cost of the package either from a fabrication or an assembly standpoint and, in addition, has the further advantage that it provides an additional and convenient space for the printing of advertising and instructions.

While the invention has been illustrated and described in its preferred embodiments, it should be understood that the invention is not to be limited to the precise details herein illustrated and described since the same can be carried out in other ways falling in the scope of the invention as claimed.

I claim:

1. A protective device for pies and the like comprising a container having an outwardly extending rim and a sheet of material dimensioned to overlie and to have a portion extend beyond the rim of said container, said sheet being severed in the region of the extending portions inwardly of the edge thereof to form a plurality of flaps, the free end of each of said flaps being inwardly directed toward the center of the sheet and the upper surface of each of said flaps being in engagement with the underside of said container rim, the extending portion being foldable to move said flap into cooperating engagement with the container.

2. A protective device for pies and the like comprising in a container having an outwardly extending rim and comprising a sheet of material overlying and extending beyond the rim of said container, said sheet of material having a plurality of flaps formed by severing the material in the region of the extending portions inwardly of the edge thereof, the severance lines being positioned on said sheet so that the free end of each of said flaps is inwardly directed toward the center of the sheet, the upper surface of each of said flaps being in engagement with the undersurface of said container rim, and score lines extending from the outer end of said severance lines transversely thereof to the edge of said sheet to form hinge lines about which said flaps and edge portions of the sheet pivot to move the free ends of the flaps into cooperating engagement with said container.

3. A protective device for pies and the like comprising a container having an outwardly extending rim and a generally rectangular sheet of material dimensioned so that at least its corner portions extend beyond the rim of said container, said sheet of material having a flap formed in each corner by severing the corner from the sheet along a line inwardly of the edges thereof, the lines of severing defining a flap whose movable end is directed along a diagonal of the rectangular sheet and which is dimensioned so that the upper surface of said flap is in engagement with the underside of a container rim by folding of the sheet corner along a line transverse to the sheet diagonal.

4. A protective device for pies and the like comprising a container having an outwardly extending rim and a sheet of material dimensioned to overlie and have opposed portions thereof extend beyond the rim of the container, said sheet having a plurality of flaps formed by severing said extending portions from said sheet along a line intermediate the edges thereof, said line of severance having an inwardly directed arcuate portion intermediate its ends defining an inwardly extending flap each of said flaps having the underside thereof in engagement with the underside of said rim, the extending portion of said sheet being foldable to move said arcuate portion into cooperating engagement with said container.

5. A protective device for pies and the like comprising a container having an outwardly extending rim and a sheet of material dimensioned to overlie a container and having a plurality of edge portions thereof extending beyond the rim of the container, said sheet having a plurality of flaps formed by severing the material in the region of each of said extending sheet portions, each line of severance being positioned intermediate the edges of said sheet and having an arcuate portion defining an inwardly extending flap, each of said flaps having its underside in engagement with the underside of said container rim, said sheets further having score lines extending from the lines of severance to the edges of said sheet to define hinge lines about which the extending portions are foldable to move said flaps into engagement with said rim.

6. A protective container for pies and the like comprising a generally circular pie pan having an outwardly extending rim, a sheet of paperboard dimensioned to overlie and have opposed side portions extending beyond the rim of said pan, a flap formed in each extending side portion of said sheet, said flap being formed by severing the side portion from said sheet along a line intermediate the edges of said sheet, said line of severing having a central arcuate portion defining an inwardly extending flap of radial length slightly less than the rim width and end portions generally conforming to the periphery of the rim, each extending side portion having been folded so that the underside of each said flap is in engagement with the underside of said rim.

References Cited in the file of this patent

UNITED STATES PATENTS

| | | |
|---|---|---|
| 1,841,875 | Brooks | Jan. 19, 1932 |
| 1,978,296 | Donovan et al. | Oct. 23, 1934 |

FOREIGN PATENTS

| | | |
|---|---|---|
| 704,045 | Great Britain | Feb. 17, 1954 |